(No Model.)
G. C. AHRENS.
MILL.
No. 556,607. Patented Mar. 17, 1896.
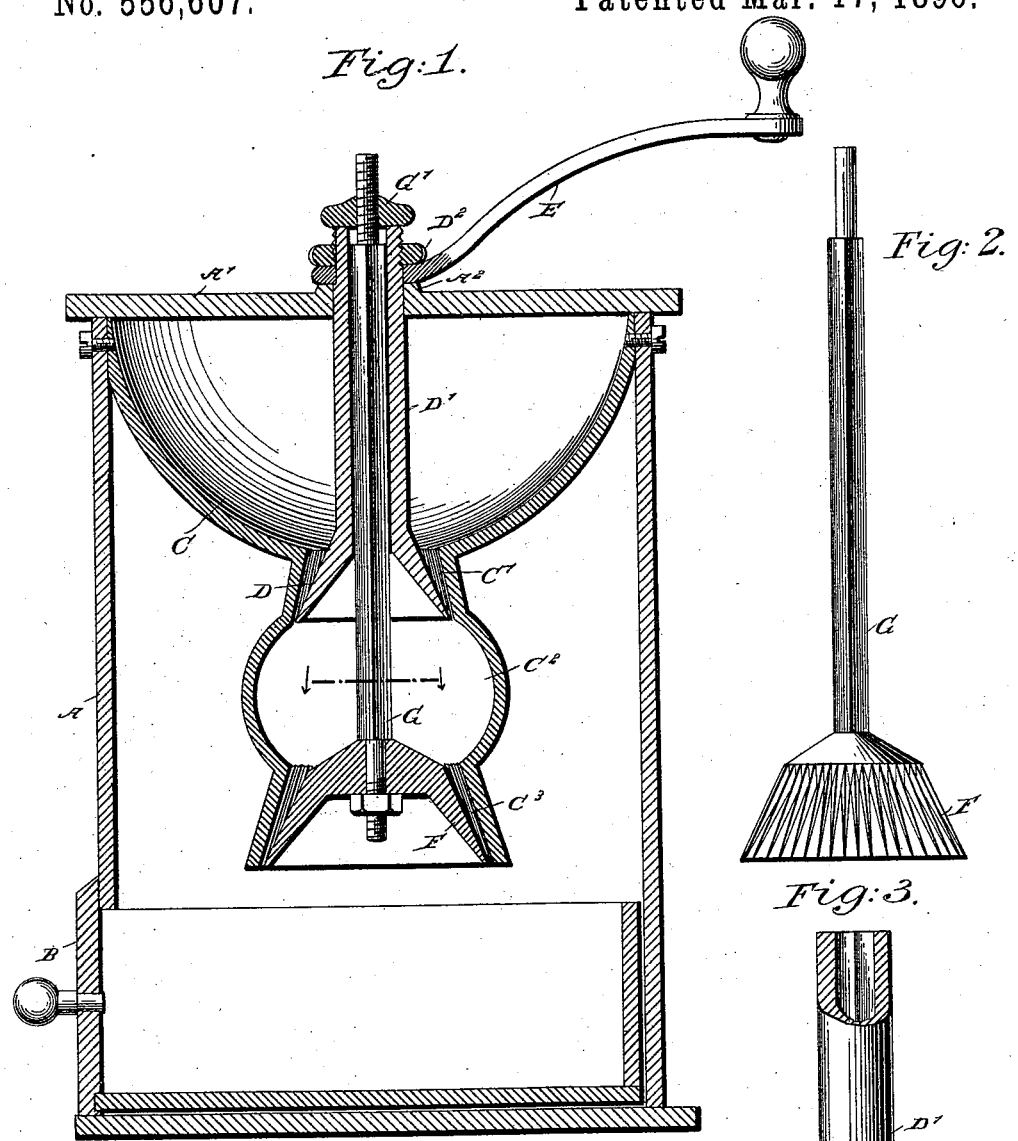
WITNESSES:
John A. Rennie
Geo. J. Hoster
INVENTOR
G. C. Ahrens
BY
Munn & Co.
ATTORNEYS.

UNITED STATES PATENT OFFICE.

GEORGE CHRISTOPHER AHRENS, OF GILLESPIE, ILLINOIS.

MILL.

SPECIFICATION forming part of Letters Patent No. 556,607, dated March 17, 1896.

Application filed July 1, 1895. Serial No. 554,627. (No model.)

*To all whom it may concern:*

Be it known that I, GEORGE CHRISTOPHER AHRENS, of Gillespie, in the county of Macoupin and State of Illinois, have invented a new and Improved Mill, of which the following is a full, clear, and exact description.

The object of the invention is to provide a new and improved mill for grinding coffee, spices, cereals, and other substances, which is simple and durable in construction, very effective in operation, and arranged to grind a large amount of material without much exertion on the part of the operator.

The invention consists of a crushing-bur and a grinding-bur, of which the former forms the feed for the latter.

The invention also consists in certain parts and details and combinations of the same, as will be fully described hereinafter and then pointed out in the claims.

Reference is to be had to the accompanying drawings, forming a part of this specification, in which similar characters of reference indicate corresponding parts in all the views.

Figure 1 is a sectional side elevation of the improvement. Fig. 2 is a side elevation of the grinding-bur. Fig. 3 is a like view of the crushing-bur with parts in section. Fig. 4 is a plan view of the same, and Fig. 5 is a plan view of the grinding-bur.

The improved mill is provided with the usual casing A, having a cover A' and containing a drawer B for receiving the ground material. In the upper part of the casing A is secured a hopper C, into which the material is placed, the latter being introduced through the usual door in the cover A'.

The lower end of the hopper C is provided with a conical offset C', formed on its inside with teeth or corrugations to form a crushing-surface which operates in conjunction with the crushing-bur D, provided with a hollow stem D', mounted to turn in the cover A' and carrying at its outer end a handle E, adapted to be turned by the operator, and resting on an offset $A^2$ on the cover A'. A nut $D^2$ screws on the upper end of the stem D', so as to hold the crushing-bur D in proper position relative to the crushing-surface in the extension C'. The lower end of the bur D discharges into a hopper $C^2$, somewhat larger than the extension C', and leading to a conical grinding-surface $C^3$, operating in conjunction with a grinding-bur F, secured on the lower end of a spindle G, preferably made polygonal in cross-section and fitting into a correspondingly-shaped opening in the stem D'. On the upper threaded end of the spindle G screws a nut G', resting on the top of the stem D', so that the grinding-bur F can be adjusted relative to the grinding-surface $C^3$.

Now it will be seen that when the operator turns the handle E the stem D' and bur D, as well as the spindle G and its bur F, are rotated simultaneously, and the substance contained in the hopper C and passing onto the bur D is crushed by the latter and the crushing-surface C', and the crushed material finally passes into the hopper $C^2$ and to the grinding-bur F and its grinding-surface $C^3$, so that the crushed material is now ground to the desired degree.

It will be seen that by the arrangement described the bur D forms a feed for the bur F, as all the material crushed by the said bur F, passes to the grinding-bur F. By first crushing the material in the manner described and feeding it to the grinding-bur which rotates with the crushing-bur, less power is required to actuate the mill, and a larger amount of material is ground in the same time than is now required in mills of ordinary construction.

I do not limit myself to any particular form of burs and grinding-surfaces, as the same may be varied without departing from the principle of my invention. It will be understood that the ground material, after leaving the lower end of the bur F, falls into the drawer B and may be removed therefrom by withdrawing the latter from the casing A.

Having thus described my invention, I claim as new and desire to secure by Letters Patent—

1. In a mill of the character described, the combination with crushing and grinding surfaces arranged one above the other, of a crushing-bur for the crushing-surface, a grinding-bur for the grinding-surfaces, the stem of one of the burs being hollow to receive the stem of the other bur, the said stems being locked together to turn in unison, and a handle for operating said stems substantially as described.

2. In a mill of the character described, the combination with crushing and grinding surfaces arranged one above the other, of a crushing-bur provided with a hollow stem having a polygonal opening, a grinding-bur having a polygonal stem projecting into the stem of the crushing-bur, and a handle for turning said stems, substantially as described.

3. In a mill of the character described, the combination with crushing and grinding surfaces arranged one above the other, of a crushing-bur provided with a hollow stem having a polygonal opening, a grinding-bur provided with a polygonal stem projecting through the stem of the crushing-bur, and having its end screw-threaded, a nut on the end of the said stem, and a handle secured to the hollow stem of the crushing-bur, substantially as described.

4. A grinding-mill, comprising a hopper provided at its bottom with a conical offset having teeth on its inner surface, a second hopper smaller than the first and extending from the offset thereof, said second hopper being provided with a conical offset having teeth on its inner surface, a crushing-bur provided with a stem having a polygonal bore, a grinding-bur having a polygonal stem projecting through the hollow stem of the crushing-bur and having its end screw-threaded, a nut on the said threaded end and resting upon the hollow stem, and a handle secured to the said hollow stem, substantially as herein shown and described.

GEORGE CHRISTOPHER AHRENS.

Witnesses:
 JOHN F. AHRENS,
 CHAS. E. BROOKS.